W. GIERTH.
PLUMBER'S TORCH.
APPLICATION FILED DEC. 7, 1909.
965,136.
Patented July 19, 1910.
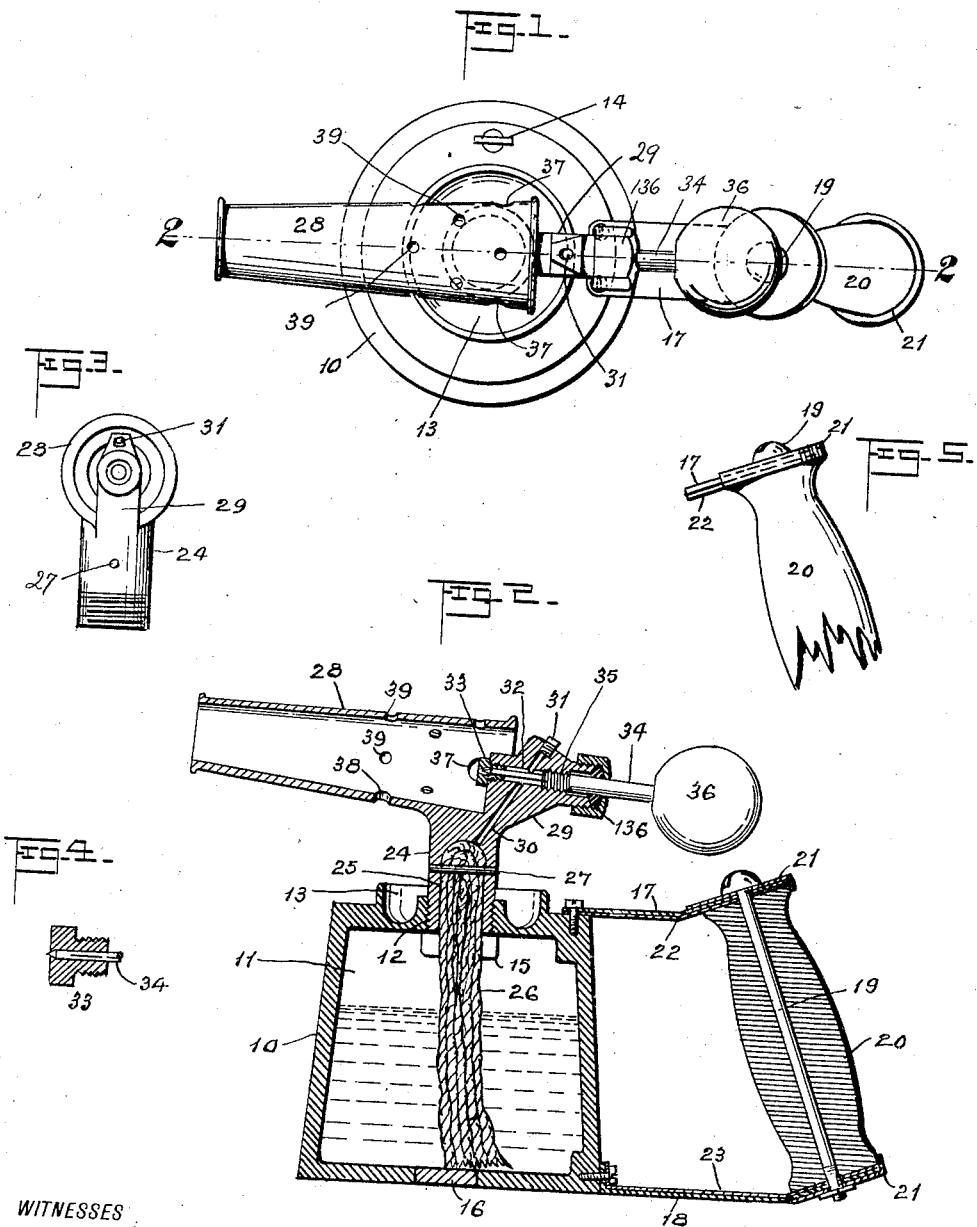
WITNESSES
Frederick Germann Jr.
Frances E. Blodgett.
INVENTOR
William Gierth,
BY
Russell M. Everett,
ATTORNEY.

UNITED STATES PATENT OFFICE.

WILLIAM GIERTH, OF NEWARK, NEW JERSEY, ASSIGNOR OF ONE-HALF TO EDWARD E. DECKER, OF ELIZABETH, NEW JERSEY, AND ONE-HALF TO HARRY GRIES, OF BLOOMFIELD, NEW JERSEY.

PLUMBER'S TORCH.

965,136.

Specification of Letters Patent. Patented July 19, 1910.

Application filed December 7, 1909. Serial No. 531,777.

*To all whom it may concern:*

Be it known that I, WILLIAM GIERTH, a citizen of the United States, residing at Newark, in the county of Essex and State of New Jersey, have invented certain Improvements in Plumbers' Torches, of which the following is a specification.

The objects of this invention are to secure a plumber's torch in which there is no need of an air-pump or the like to produce pressure on the liquid fuel; to thus simplify the torch, and secure compactness and ease of operation; to provide an efficient and durable torch of improved construction, and to obtain other advantages and results as may be brought out in the following description.

Referring to the accompanying drawings, in which like numerals of reference indicate corresponding parts in each of the several figures, Figure 1 is a plan of my improved torch; Fig. 2 is a central vertical section of the same, on line 2—2, Fig. 1; Fig. 3 is a rear view in elevation of the burner; Fig. 4 is an enlarged central section of a certain discharge nipple, and Fig. 5 illustrates a detail of the handle construction.

In said drawings, 10 indicates the reservoir of my improved torch, said reservoir being formed with heavy, thick walls adapted to conduct heat and withstand pressure. Preferably, said reservoir is cast of brass, with walls about three-sixteenths of an inch thick, and providing an interior chamber 11 to receive the liquid fuel, such as gasolene. The top of the reservoir has a central aperture 12, which is preferably threaded, and around said aperture is an annular trough 13 formed in the top of the reservoir to contain a little gasolene to start the torch. At one side of said trough 13 is a screw plug 14, by removing which the reservoir can be filled with fuel, and preferably the walls of the reservoir are thickened, as at 15, to provide a seat for said plug. The reservoir is preferably cast with a hole in its bottom, in order to insure walls of uniform thickness, as will be understood by those skilled in foundry work, said hole being afterward filled with a disk 16 permanently soldered therein.

At one side of itself the reservoir 10 is provided with a handle, which may be of any suitable construction. For illustration I have shown flat sheet metal arms 17 and 18 projecting from the upper and lower parts of the reservoir, substantially horizontal, and perforated at their outer ends to receive a bolt 19 on which is a wooden handle 20. Preferably sheet-metal caps 21 are employed at the ends of the handle 20, and heat insulating material is placed at the inner facing side of the upper and lower arms 17 and 18, as shown at 22 and 23.

The burner of the torch is somewhat T-shaped, and has a short stem 24 seated in the aperture 12 of the top of the reservoir. Said burner is preferably a casting, also of brass, and its said stem 24 is preferably screwed into the aperture 12. This stem is short so as to locate the ignition chamber of the burner as close to the reservoir as possible, and is hollowed from its lower end upward, as at 25, to receive the wick 26. The hollowed cavity terminates in a rounded upper end, preferably, and the wick is crowded into said cavity to fill the same and depend therefrom into the reservoir. Preferably a pin 27 is passed transversely through the stem 24, so as to extend through the wick 26 and hold the same against withdrawal from the cavity.

The upper part of the burner provides a horizontally disposed tubular nozzle 28, and at the rear of said nozzle in the open end thereof, is a radially disposed head 29, both said nozzle and head being integral with the stem 24. Said head 29 is bored obliquely from its upper part at the rear of the nozzle 28 downward to the top of the cavity 25 of the stem, as at 30, the top of said boring being afterward permanently closed by a plug 31. The head is also bored horizontally, or in alinement with the nozzle 28, as at 32, said boring 32 intersecting the oblique boring 30, to form a vapor duct. In the forward end of the horizontal boring 32 is removably seated a nipple 33 which provides at its forward or outer end a minute vapor discharge opening into the nozzle 28. Preferably this nipple 33 is screwed into the head 29 by means of its forward end, which is adapted to be grasped by a tool inserted through the nozzle 28. The bore of the nipple 33 contracts conically at its forward end to the discharge opening, and provides a seat for the forward end of a needle valve 34 which screws into the rear end of the horizontal boring 32, as at 35, and is operated by a handle 36 on its rear end.

A packing 136 surrounds the stem of the needle valve 34 at the rear end of the head 29, and the point of the needle valve, when completely seated, is adapted to project very slightly through the discharge opening in the nipple 33, so as to clean the same or clear it of obstructions, as shown in Fig. 4.

It will be understood that the head 29 does not by any means completely fill the rear end of the nozzle 28 but affords space at the sides and top of itself for the entrance of air, as clearly shown in Fig. 3. Furthermore, the walls of said nozzle are apertured adjacent to its rear end, and preferably large apertures 37, 37 are at the opposite sides of the nozzle in transverse line with the discharge opening of the nipple 33 and another large opening 38 at the bottom of the nozzle just forward of the stem 24, while other small apertures 39 are variously disposed in the walls of the nozzle forward of the large openings 37 and above the large opening 38, but to the rear of the same.

In operation, a little gasolene is placed in the annular trough 13 and ignited; this serves to vaporize the gasolene in the wick in the stem 24 and the vapor passes up through the duct or borings 30 and 32 and out through the nipple 33, the valve 34 being open. As soon as the flow of gas into the nozzle 28 is sufficient, it is ignited at the mouth or forward end of said nozzle, and after that the heat of such flame is transmitted to the solid casting of the burner and casting of the reservoir 10 so that a steady supply of vapor under great pressure is provided. The heating of the reservoir 10 heats the gasolene therein and greatly facilitates its vaporization.

Having thus described the invention, what I claim is:

1. In a plumber's torch, the combination with a reservoir, of a burner comprising a substantially vertical stem and a substantially horizontal nozzle and a head at the rear end of said nozzle lying partially in the chamber of the nozzle, said head being disposed radially of the nozzle and affording spaces at its sides and top for the entrance of air to the nozzle, said head having a vapor duct extending upwardly through itself and a horizontal duct in alinement with the nozzle, said ducts intersecting each other and the head providing at the forward end of the horizontal duct an interior valve seat and a discharge opening therethrough into the nozzle, and a valve for said valve seat between the same and the junction of the said ducts.

2. A plumber's torch, comprising in combination a reservoir having in its top an aperture and an exterior trough, a burner having a substantially horizontal nozzle and a substantially vertical stem seated in said aperture of the reservoir, said stem being short to locate the nozzle close to the said trough and hollowed at its lower end, the burner having a vapor duct leading from the upper part of the cavity of said stem, a valve for said duct, a wick having its upper end in said cavity of the burner stem and its lower end in the reservoir, and a pin extending transversely through said wick and burner stem below the said horizontal nozzle.

3. In a plumber's torch, the combination with a reservoir, of a burner comprising a substantially vertical stem and a substantially horizontal nozzle and a head at the rear end of said nozzle lying partially in the chamber of the nozzle, said head being disposed radially of the nozzle and affording spaces at its sides and top for the entrance of air to said nozzle, the burner having a vapor duct leading through its stem into said head, a valve for said duct, and a removable nipple at the front end of the head affording a discharge opening from the vapor duct into the nozzle and a seat for the valve, said nipple being removable through the nozzle.

4. In a plumber's torch, the combination with a reservoir, of a burner comprising a substantially vertical stem, and a substantially horizontal nozzle and a head at the rear end of said nozzle lying partially in the chamber of the nozzle, said head being disposed radially of the nozzle and affording spaces at its sides and top for the entrance of air to said nozzle, said head further having an oblique boring extending rearwardly upward through itself and a horizontal boring in alinement with the nozzle, said borings intersecting each other, a valve projecting into the rear end of the horizontal boring, and a removable nipple at the front end of the horizontal boring affording a discharge opening into the nozzle and a seat for the valve, said nipple being removable through the nozzle.

WILLIAM GIERTH.

In the presence of—
RUSSELL M. EVERETT,
FRANCES W. BLODGETT.